US010641952B2

(12) United States Patent
Yu et al.

(10) Patent No.: US 10,641,952 B2
(45) Date of Patent: May 5, 2020

(54) BEND-INSENSITIVE SINGLE MODE OPTICAL FIBER

(71) Applicant: YANGTZE OPTICAL FIBRE AND CABLE JOINT STOCK LIMITED COMPANY, Wuhan, Hubei (CN)

(72) Inventors: Jiangang Yu, Hubei (CN); Chen Yang, Hubei (CN); Song Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/975,913

(22) Filed: May 10, 2018

(65) Prior Publication Data

US 2018/0335562 A1    Nov. 22, 2018

(30) Foreign Application Priority Data

May 16, 2017    (CN) .......................... 2017 1 0344555

(51) Int. Cl.
| | | |
|---|---|---|
| G02B 6/028 | (2006.01) | |
| G02B 6/30 | (2006.01) | |
| G02B 6/036 | (2006.01) | |
| G02B 6/255 | (2006.01) | |

(52) U.S. Cl.
CPC ......... *G02B 6/028* (2013.01); *G02B 6/03638* (2013.01); *G02B 6/03655* (2013.01); *G02B 6/305* (2013.01); *G02B 6/2552* (2013.01)

(58) Field of Classification Search
CPC .. G02B 6/028; G02B 6/0281; G02B 6/03633; G02B 6/03638; G02B 6/03683; G02B 6/03688; G02B 6/0365; G02B 6/305
USPC ........................................... 385/43, 123–128
See application file for complete search history.

(56) References Cited

U.S. PATENT DOCUMENTS

| | | | | |
|---|---|---|---|---|
| 4,426,215 A | * | 1/1984 | Murphy | ............... G02B 6/2856 65/402 |
| 10,295,733 B2 | * | 5/2019 | de Montmorillon | ........................ G02B 6/0281 |
| 2007/0003198 A1 | * | 1/2007 | Gibson | ............. C03B 37/01211 385/123 |

* cited by examiner

*Primary Examiner* — Michael P Mooney
(74) *Attorney, Agent, or Firm* — Tim Tingkang Xia, Esq.; Locke Lord LLP

(57) ABSTRACT

A fused-biconical-taper bend-insensitive single mode optical fiber includes a core and a cladding. The core is a fluorine-germanium co-doped silicon-dioxide quartz glass layer, a diameter $D_{core}$ thereof is 7-10 μm, and a relative refractive index difference Δ1 thereof is 0.20% to 0.40%. A range of ΔGe is 0.30% to 0.60%, and a range of ΔF is −0.05% to −0.15%. The cladding includes three layers. A first layer is a fluorine-germanium co-doped silicon-dioxide quartz glass layer, a relative refractive index difference Δ31 thereof is −0.02% to −0.10%, and a diameter D31 thereof is 15-30 μm. A second layer is a fluorine-doped silicon-dioxide quartz glass layer, a relative refractive index difference Δ32 thereof is −0.01% to −0.05%, and a diameter D32 thereof is 30-50 μm. A third layer is a pure silicon-dioxide quartz glass layer, and a diameter D33 thereof is 124-126 μm.

18 Claims, 1 Drawing Sheet

BEND-INSENSITIVE SINGLE MODE OPTICAL FIBER

CROSS-REFERENCE TO RELATED APPLICATION

This application claims priority to Chinese Patent Application No. 201710344555.1, filed May 16, 2017 in the State Intellectual Property Office of P.R. China, which is hereby incorporated herein in its entirety by reference.

FIELD OF THE INVENTION

The present disclosure relates to a bend-insensitive single mode optical fiber suitable for use in a fused-biconical-taper. The bend-insensitive single mode optical fiber possesses a more stable and excellent performance during high-temperature processing including fusing, tapering, etc., is suitable for research and development of and application in optical fiber couplers and optical fiber sensors, and belongs to the optical fiber technical field.

BACKGROUND OF THE INVENTION

In the contemporary communication network, client-oriented access technology has always been a difficulty which restricts rapid development of high-bandwidth services. After arriving at the access network via transmission devices, the flood of information must be divided into streams to be interconnected with the terminal client. The bend-insensitive technology is a key link in the optical fiber access technology and a basic transmission medium of the optical fiber access network, can send information to the terminal client through complicated and changeable regions, and steadily realize high-bandwidth interconnection. It is classified by International Telecommunication Union as ITU-T G.657. G.657 bend-insensitive single mode optical fiber is mainly used in small and narrow space or at a corner, in a complex environment like a wire distribution box and an optical splitter, and in the field of optoelectronic devices, and still has a low additional bending loss with a bending radius equal to or smaller than 10 mm.

With the rapid development of optical fiber communication technology, optical fiber devices have been more and more widely applied in the optical communication field, among which optical fiber couplers have become the most-widely-applied passive optical fiber device. Optical fiber couplers play a vital role in realizing split combination, insertion, and distribution of optical signals. Optical fiber couplers are a multi-function and multi-purpose device and are one of the most important passive optical devices. In the developing process of optical fiber couplers, there are mainly three manufacturing methods: the etching method, the polishing and grinding method, and the fused biconical taper method. Among the three methods, the fused biconical taper method is most widely used thank to a simple operation, a low manufacturing cost, and a small device loss. Regarding all characteristic indexes, fused-biconical-taper optical fiber couplers are the most representative optical device.

As for traditional G.657 single mode optical fibers, the core thereof and the cladding thereof are designed with different materials, leading to a great difference in refractive indexes therebetween. Thus, in pursuit of a satisfactory macro-bending performance, a trench structure with a large proportion of fluorine and a deep sag of Δ is usually added in the design of an outer cladding. Therefore, during the fused-biconical-taper process, since material characteristics of the core and the cladding do not match (appearing as a mismatch in viscosity and in coefficient of thermal expansion), changes of an optical fiber waveguide structure do not synchronize, resulting in failure to reach a required optical splitting ratio no matter how technological conditions of fused biconical taper are optimized and a great loss during the process.

Although a common G.652 single mode optical fiber can satisfy the requirements for fused-biconical-taper performance, its bending loss is high when it comes to a small bending radius (smaller than 30 mm). Therefore, common G.652 single mode optical fibers are not suitable for being used in small-sized devices with special bending requirements.

SUMMARY OF THE INVENTION

In order to introduce the present disclosure, the following terms are defined.

Refractive index profile: the relation between the refractive index of glass in an optical fiber and the radius of the optical fiber.

Relative refractive index difference: $\Delta=(n_i-n_0)/n_0*100\%$. $n_i$ and $n_0$ are respectively a refractive index of a corresponding part and a refractive index of pure silicon-dioxide quartz glass.

Contribution of fluorine (F): a relative refractive index difference $\Delta F$ of F-doped quartz glass relative to pure silicon-dioxide quartz glass, used for indicating the amount of F doped.

Contribution of germanium (Ge): a relative refractive index difference $\Delta Ge$ of Ge-doped quartz glass relative to pure silicon-dioxide quartz glass, used for indicating the amount of Ge doped.

The technical problem to be solved by the present disclosure is to provide a bend-insensitive single mode optical fiber regarding the above deficiencies existing in the prior art. The optical fiber is suitable for fused biconical taper, causes a low transmission loss, a low bending loss, a low fusion loss, and a low loss in a tapering process, and thus is suitable for research and development of and application in optical fiber couplers and optical fiber sensors.

In order to solve the above technical problem, the present disclosure provides the following technical solution. The optical fiber comprises a core and a cladding. The core is an F—Ge co-doped silicon-dioxide quartz glass layer, a diameter $D_{core}$ thereof is 7 μm to 10 μm, and a relative refractive index difference $\Delta 1$ thereof is 0.20% to 0.40%. A range of $\Delta Ge$ is 0.30% to 0.60%, and a range of $\Delta F$ is −0.05% to −0.15%. The cladding comprises three layers. A first layer closely surrounds the core, the first layer is an F—Ge co-doped silicon-dioxide quartz glass layer, a relative refractive index difference $\Delta 31$ thereof is −0.02% to −0.10%, and a diameter D31 thereof is 15 μm to 30 μm. A second layer closely surrounds the first layer, the second layer is an F-doped silicon-dioxide quartz glass layer, a relative refractive index difference $\Delta 32$ thereof is −0.01% to −0.05%, and a diameter D32 thereof is 30 μm to 50 μm. A third layer closely surrounds the second layer, the third layer is a pure silicon-dioxide quartz glass layer, and a diameter D33 thereof is 124 μm to 126 μm.

According to the above solution, in the first layer, a range of $\Delta Ge$ is 0.05% to 0.25%, and a range of $\Delta F$ is −0.05% to −0.30%.

According to the above solution, a cut-off wavelength of the optical fiber is 1180 nm to 1360 nm.

According to the above solution, a MFD (mode field diameter) of the optical fiber is 8 μm to 11 μm in a wavelength range of 1310 nm to 1550 nm.

According to the above solution, attenuation of the optical fiber is less than or equal to 0.35 dB/km in a wavelength range of 1310 nm to 1550 nm.

According to the above solution, a macro-bending loss of the optical fiber is less than or equal to 0.5 dB/(Φ20 mm-1 circle) in a wavelength range of 1310 nm to 1550 nm.

According to the above solution, a loss of the optical fiber in a fused biconical taper process is less than or equal to 0.1 dB, and device isolation of the optical fiber is larger than or equal to 20 dB.

The present disclosure achieves the following beneficial effects.

1. An optical fiber core co-doped with F and Ge, compared with an optical fiber core only doped with Ge, can optimize the material structure of the optical fiber, reduce defect concentrations formed by being doped only with Ge and improve stress distribution, and in the meanwhile can eliminate a central sag, is easy for fused biconical taper, and causes a low loss during the fused-biconical-taper process. 2. Among layers of the optical fiber cladding, there is a pure silicon-dioxide quartz glass layer which is entirely made of cashing/lining quartz material and bears tensile stress formed during a wire-drawing process. The stress borne by the core is the compressive stress. The above is conducive to mechanical protection of the optical fiber. 3. Among layers of the optical fiber cladding, there is a thin F-doped silicon-dioxide quartz glass layer which acts as a buffer layer. The layer can obstruct hydroxy ions and heavy metal ions of the lining material and reduce their effects on optical fiber attenuation and especially the water peak. 4. Among inner layers of the optical fiber cladding, there is an F—Ge co-doped silicon-dioxide quartz glass layer. The above layer can reduce viscosity of the inner cladding material and thus better match viscosity of the core material, and in the meanwhile can improve the bending resistant property of the optical fiber, is conducive to reducing an additional macro-bending loss of the optical fiber with a small bending radius, and conforms to requirements prescribed by ITU-T for indexes of G.657.A1 optical fibers. 5. The fused-biconical-taper bend-insensitive single mode optical fiber of the present disclosure possesses a more stable and excellent performance during high-temperature processing including fusing, tapering, etc., causes a low transmission loss, a low bending loss, a low fusion loss, and a low loss in a tapering process, and thus is suitable for research & development of and application in optical fiber couplers and optical fiber sensors.

BRIEF DESCRIPTION OF THE DRAWINGS

In FIG. 1, 00 corresponds to a core of an optical fiber, 31 corresponds to a first layer of a cladding of the optical fiber, 32 corresponds to a second layer of the cladding of the optical fiber, and 33 corresponds to a third layer of the cladding of the optical fiber.

DETAILED DESCRIPTION OF THE EMBODIMENTS

Figure 1:
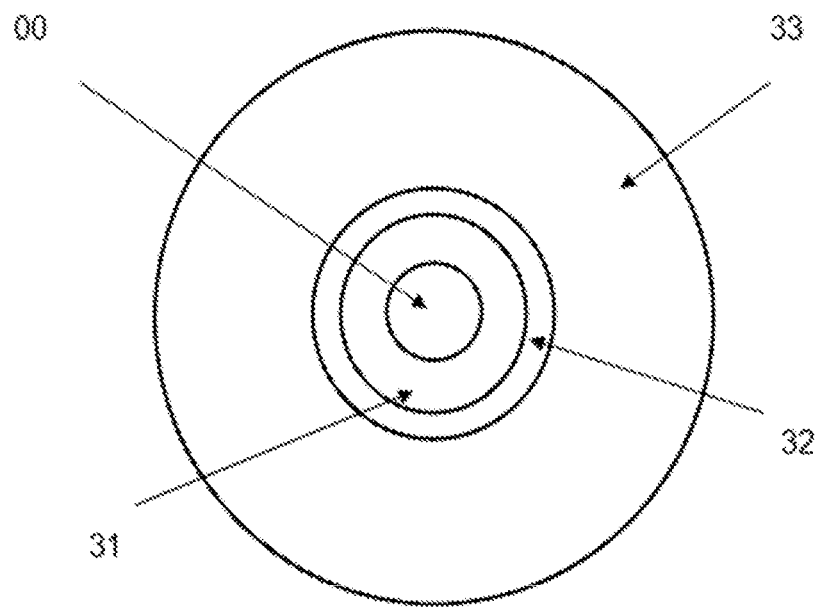
FIG. 1 schematically shows a section in a radial direction in one embodiment of the present disclosure.
Figure 2:
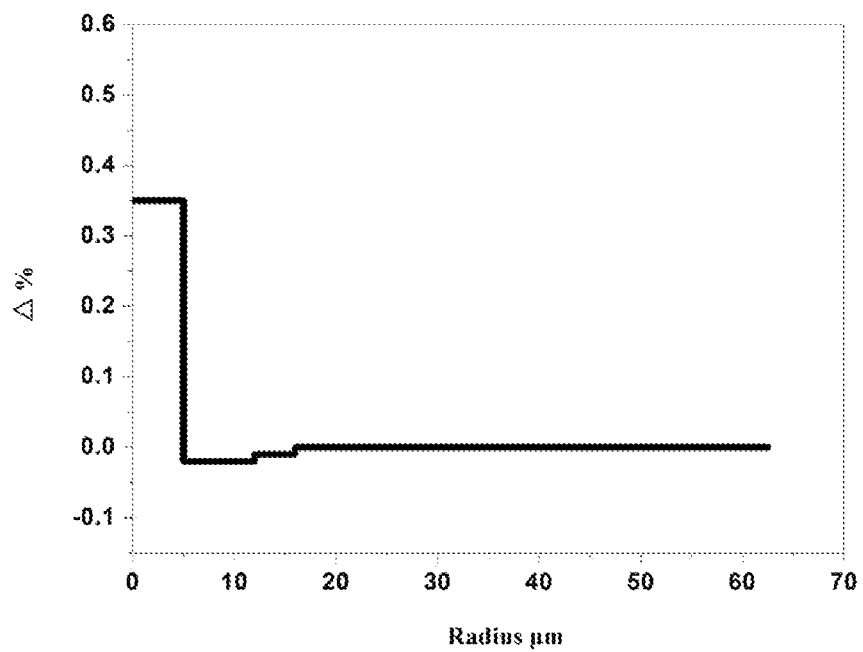
FIG. 2 schematically shows a refractive index profile in one embodiment of the present disclosure.

The present disclosure will be further explained with reference to the following detailed embodiments.

A bend-insensitive single mode optical fiber suitable for use in a fused-biconical-taper in the embodiments of the present disclosure comprises a core and a cladding. The core 00 is made of F—Ge co-doped quartz glass. A cladding surrounds the core and comprises three layers. A first layer 31 closely surrounds the core and is also made of F—Ge co-doped quartz glass. A second layer 32 closely surrounds the first layer 31 and is made of F-doped quartz glass. Its relative refractive index difference Δ32 is larger than Δ31. A third layer 33 closely surrounds the second layer 32 and a diameter D33 thereof is 124 μm to 126 μm. The third layer is a pure silicon-dioxide quartz glass layer, i.e. a relative refractive index difference Δ33 thereof is 0%.

According to the above technical solution, parameters of an optical fiber are designed within a specified range, a core rod is manufactured by way of well-known technologies: the PCVD (plasma chemical vapor deposition) technology, the MCVD (modified chemical vapor deposition) technology, the VAD (vapor phase axial deposition) technology, or the OVD (outside vapor deposition) technology, and manufacture of an entire wire-drawing rod is completed by way of outer-cladding technologies such as the cashing technology, the POD (plasma outside deposition) technology, the OVD technology, or the VAD technology. The PCVD technology and the POD technology have certain advantages in precise profile design, deposition of high-concentration F doped, and elimination of a central sag.

After the wire-drawing rod is manufactured, wire-drawing of the optical fiber is performed in a wire-drawing tower. A wire-drawing speed is no larger than 800 m/min and a wire-drawing coating tension is between 200 g and 260 g.

A refractive index profile of the optical fiber drawn is tested by means of an IFA-100 device (Inerfiber Analysis. LLC). Main parameters of the embodiment of the refractive index profile of the optical fiber are shown in Table 1.

A tapering test and assessment is performed on the optical fiber drawn by a fused biconical optical-fiber taper machine (FUSOTEK) through a parallel method. A loss in the process (insertion loss) and isolation (return loss) are two important parameters of an optical fiber coupler. The former parameter describes an optical fiber coupling ability in a forward direction and the lower the loss is, the better the coupling is. The latter parameter describes an ability preventing optical waves from transmission in other directions, especially in an opposite direction, and regarding the value thereof, the larger the better.

Main property parameters of the optical fiber drawn are shown in Table 2. Relevant tests are carried out in the embodiments of the optical fiber under specified indexes and technological conditions for the manufacturing, which all satisfies requirements of claims in the present disclosure.

The following conclusions can be seen from the embodiments.

1. If a diameter of the core is made to be smaller, in order to ensure use of an optical fiber with an operation wavelength of 1310 nm, Δ must be made to be larger according to the calculation formula of a cut-off wavelength $\lambda_c = \pi D_{core} n_0 (2\Delta)^{0.5}/V_c$ ($n_0$ stands for the refractive index of $SiO_2$ and $V_c$ stands for a normalized frequency), and the doping amount of Ge and F shall be correspondingly increased, which is not conducive to controlling defects, attenuation, and loss of the optical fiber. As can be seen from the actual test result, though the macro-bending property is good, the attenuation and loss of the optical fiber are obviously high, which fails to satisfy the G.657.A1 index requirement, such as the embodiment 1. It can be seen that, if the core diameter is decreased too much, Δ will be forced to be increased, which then leads to increase of doping and attenuation of the optical fiber.

2. If the core diameter is increased too much, the MFD increases, which is conducive to tapering; and Δ correspondingly decreases and the attenuation and loss of the optical fiber are satisfactory. Yet, cut-off conditions of a single mode are hard to satisfy. To satisfy the conditions, the wire-drawing temperature shall be largely increased and wire-drawing tension shall be decreased, which is not conducive to controlling strength of the optical fiber. In the meanwhile, even if the cut-off wavelength is limited in the specified range, with the macro-bending of the optical fiber tested being large, the G.657.A1 index requirement cannot be satisfied. Thus, the bending resistant ability of the optical fiber is obviously weakened, such as the embodiment 8. It can be seen that, the core diameter being too large and the doping amount being too small cannot satisfy design requirements of the optical fiber, either.

concentration of the F doped is increased. Due to a small geometrical size, the F ion frees itself quickly during the fusing, which changes the waveguide structure and is not conducive to the tapering and molding. The embodiments 2 and 3 can be deemed as examples.

5. If the diameters of the core and the cladding and Δ are properly designed, not only the attenuation and macro-bending conforms to the G.657.A1 index requirement, but also the tapering property is good, such as the embodiments 4, 5, and 6.

In summary, with respect to the optical fiber manufactured according to the technical solution of the present disclosure, the cut-off wavelength is 1180 nm to 1360 nm; in an operation wavelength range of 1310 nm to 1550 nm, the MFD is 8 μm to 11 μm, the attenuation is less than 0.35 dB/km, and the macro-bending loss is less than 0.5 dB/(Φ20 mm-1 circle); the loss in the tapering process is less than 0.1 dB; and the device isolation is larger than 20 dB.

TABLE 1

Structure parameters of the optical fiber

| Embodiment | Dcore (μm) | Δ1 (%) | ΔGe (%) | ΔF (%) | D31 (μm) | Δ31 (%) | ΔGe (%) | ΔF (%) | D32 (μm) | Δ32 (%) | D33 (μm) | Δ33 (%) |
|---|---|---|---|---|---|---|---|---|---|---|---|---|
| 1 | 6.0 | 0.510 | 0.660 | −0.150 | 19.5 | −0.08 | 0.14 | −0.22 | 33 | −0.01 | 124.5 | 0 |
| 2 | 7.7 | 0.352 | 0.434 | −0.082 | 9.5 | −0.07 | 0.102 | −0.172 | 33 | −0.02 | 124.3 | 0 |
| 3 | 8.7 | 0.348 | 0.430 | −0.082 | 20.2 | −0.20 | 0.090 | −0.290 | 36 | −0.02 | 124.3 | 0 |
| 4 | 7.5 | 0.355 | 0.437 | −0.082 | 20.7 | −0.03 | 0.120 | −0.150 | 33 | −0.01 | 124.6 | 0 |
| 5 | 8.5 | 0.343 | 0.425 | −0.082 | 21.4 | −0.06 | 0.090 | −0.150 | 42 | −0.02 | 124.5 | 0 |
| 6 | 9.6 | 0.334 | 0.449 | −0.115 | 20.5 | −0.08 | 0.170 | −0.250 | 43 | −0.01 | 124.6 | 0 |
| 7 | 9.0 | 0.339 | 0.410 | −0.071 | 33.2 | −0.04 | 0.110 | −0.150 | 40 | −0.01 | 124.7 | 0 |
| 8 | 11.0 | 0.242 | 0.287 | −0.045 | 24.7 | −0.02 | 0.105 | −0.125 | 44 | −0.02 | 124.5 | 0 |

TABLE 2

Main properties of the optical fiber

| Embodiment | MFD1310/ um | MFD1550/ um | Cut-off wavelength/ nm | att_1310 | att_1383 | att_1550 | 20 mm*1 circle 1550/(dB) | Loss in the process/s/dB | isolation/ dB |
|---|---|---|---|---|---|---|---|---|---|
| 1 | 6.64 | 7.80 | 1210 | 0.371 | 0.314 | 0.207 | 0.25 | 0.075 | 23 |
| 2 | 8.65 | 9.62 | 1249 | 0.335 | 0.299 | 0.191 | 0.72 | 0.95 | 15 |
| 3 | 9.31 | 10.33 | 1307 | 0.341 | 0.305 | 0.192 | 0.18 | 1.47 | 14 |
| 4 | 8.73 | 9.96 | 1195 | 0.333 | 0.294 | 0.193 | 0.41 | 0.063 | 22 |
| 5 | 9.22 | 10.17 | 1288 | 0.336 | 0.303 | 0.194 | 0.33 | 0.03 | 27 |
| 6 | 8.73 | 9.96 | 1227 | 0.330 | 0.294 | 0.188 | 0.41 | 0.039 | 22 |
| 7 | 9.05 | 10.12 | 1300 | 0.355 | 0.295 | 0.199 | 0.30 | 0.12 | 21 |
| 8 | 11.9 | 13.15 | 1335 | 0.327 | 0.301 | 0.190 | 0.96 | 0.016 | 27 |

3. If the inner cladding closely surrounding the core is too broad, during the bending, the transmission signal will not leak out of the cladding, which is conducive to improving the macro-bending property. Yet, if it is too broad, the optical fiber stress will not be uniformly distributed, too much power in the core will leak into the cladding, scattering and attenuation of the optical fiber will increase, and in the meanwhile, it is tested that the loss in the tapering process is high, such as the embodiment 7.

4. If the inner cladding closely surrounding the core is too narrow, the light transmission signal will easily leak out of the cladding during the blending. Besides, since the ratio of the cladding to the core is small, the difficulty of the manufacturing technology will increase. However, deepening the sag of the cladding can prevent waveguide leakage and improve the bending property, and yet the tapering property will be greatly weakened. This is because the

What is claimed is:

1. A bend-insensitive single mode optical fiber suitable for use in a fused biconical taper, comprising a core and a cladding, wherein:

the core is a fluorine-germanium co-doped silicon-dioxide quartz glass layer, a diameter $D_{core}$ thereof is 7 μm to 10 μm, and a relative refractive index difference Δ1 thereof is 0.20% to 0.40%, wherein a range of ΔGe is 0.30% to 0.60%, and a range of ΔF is −0.05% to −0.15%; and the cladding comprises three layers, wherein:

a first layer closely surrounds the core, the first layer is a fluorine-germanium co-doped silicon-dioxide quartz glass layer, a diameter D31 thereof is 15 μm to 30 μm, and a relative refractive index difference Δ31 thereof is −0.02% to −0.10%, wherein a range of ΔGe is 0.05% to 0.25%, and a range of ΔF is −0.05% to −0.30%;

a second layer closely surrounds the first layer, the second layer is a fluorine-doped silicon-dioxide quartz glass layer, a relative refractive index difference Δ32 thereof is −0.01% to −0.05%, and a diameter D32 thereof is 30 μm to 50 μm; and a third layer closely surrounds the second layer, the third layer is a pure silicon-dioxide quartz glass layer, and a diameter D33 thereof is 124 μm to 126 μm.

2. The bend-insensitive single mode optical fiber according to claim 1, wherein the relative refractive index difference Δ32 of the second layer is larger than the relative refractive index difference Δ31 of the first layer.

3. The bend-insensitive single mode optical fiber according to claim 1, wherein a cut-off wavelength of the optical fiber is 1180 nm to 1360 nm.

4. The bend-insensitive single mode optical fiber according to claim 1, wherein a MFD of the optical fiber is 8 μm to 11 μm in a wavelength range of 1310 nm to 1550 nm.

5. The bend-insensitive single mode optical fiber according to claim 1, wherein attenuation of the optical fiber is less than or equal to 0.35 dB/km in a wavelength range of 1310 nm to 1550 nm.

6. The bend-insensitive single mode optical fiber according to claim 1, wherein a macro-bending loss of the optical fiber is less than or equal to 0.5 dB/(Φ20 mm-1 circle) in a wavelength range of 1310 nm to 1550 nm.

7. The bend-insensitive single mode optical fiber according to claim 1, wherein a loss of the optical fiber in a fused biconical taper process is less than or equal to 0.1 dB.

8. The bend-insensitive single mode optical fiber according to claim 7, wherein device isolation of the optical fiber is larger than or equal to 20 dB.

9. The bend-insensitive single mode optical fiber according to claim 1, wherein the optical fiber is formed by way of fusing and wire-drawing with a wire-drawing speed no larger than 800 m/min and a wire-drawing coating tension of 200 g to 260 g.

10. The bend-insensitive single mode optical fiber according to claim 1, wherein in the first layer, a range of ΔGe is 0.05% to 0.25%, and a range of ΔF is −0.05% to −0.30%.

11. The bend-insensitive single mode optical fiber according to claim 10, wherein the relative refractive index difference Δ32 of the second layer is larger than the relative refractive index difference Δ31 of the first layer.

12. The bend-insensitive single mode optical fiber according to claim 10, wherein a cut-off wavelength of the optical fiber is 1180 nm to 1360 nm.

13. The bend-insensitive single mode optical fiber according to claim 10, wherein a MFD of the optical fiber is 8 μm to 11 μm in a wavelength range of 1310 nm to 1550 nm.

14. The bend-insensitive single mode optical fiber according to claim 10, wherein attenuation of the optical fiber is less than or equal to 0.35 dB/km in a wavelength range of 1310 nm to 1550 nm.

15. The bend-insensitive single mode optical fiber according to claim 10, wherein a macro-bending loss of the optical fiber is less than or equal to 0.5 dB/(Φ20 mm-1 circle) in a wavelength range of 1310 nm to 1550 nm.

16. The bend-insensitive single mode optical fiber according to claim 10, wherein a loss of the optical fiber in a fused biconical taper process is less than or equal to 0.1 dB.

17. The bend-insensitive single mode optical fiber according to claim 16, wherein device isolation of the optical fiber is larger than or equal to 20 dB.

18. The bend-insensitive single mode optical fiber according to claim 10, wherein the optical fiber is formed by way of fusing and wire-drawing with a wire-drawing speed no larger than 800 m/min and a wire-drawing coating tension of 200 g to 260 g.

* * * * *